(12) United States Patent
Goossens et al.

(10) Patent No.: US 10,559,914 B2
(45) Date of Patent: Feb. 11, 2020

(54) CONNECTOR ASSEMBLY

(71) Applicant: FCI USA LLC, Etters, PA (US)

(72) Inventors: Thierry Goossens, Herdersem (BE); Kai Peters, Berlin (DE); Henricus E. g. Derks, Veghel (NL); Roland Tristan De Blieck, ET Oss (NL)

(73) Assignee: FCI USA LLC, Etters, PA (US)

( * ) Notice: Subject to any disclaimer, the term of this patent is extended or adjusted under 35 U.S.C. 154(b) by 667 days.

(21) Appl. No.: 15/116,839

(22) PCT Filed: Jan. 23, 2015

(86) PCT No.: PCT/US2015/012624
§ 371 (c)(1),
(2) Date: Aug. 5, 2016

(87) PCT Pub. No.: WO2015/119788
PCT Pub. Date: Aug. 13, 2015

(65) Prior Publication Data
US 2017/0170596 A1 Jun. 15, 2017

Related U.S. Application Data

(60) Provisional application No. 61/936,479, filed on Feb. 6, 2014.

(51) Int. Cl.
*H01R 4/00* (2006.01)
*H01R 13/00* (2006.01)
(Continued)

(52) U.S. Cl.
CPC .............. *H01R 13/52* (2013.01); *H01R 4/00* (2013.01); *H01R 13/00* (2013.01); *H01R 24/00* (2013.01)

(58) Field of Classification Search
CPC .... G02B 6/4284; G02B 6/4278; G02B 6/387; G02B 6/3869; G02B 6/3893;
(Continued)

(56) References Cited

U.S. PATENT DOCUMENTS 7,179,096 B2 2/2007 Dube et al.
7,182,617 B1 2/2007 Cairns et al.
(Continued)

FOREIGN PATENT DOCUMENTS

CN 101160697 A 4/2008
DE 20202835 U1 3/2003
(Continued)

OTHER PUBLICATIONS

European Communication for European Application No. 15702123.9 dated Nov. 12, 2018.
(Continued)

*Primary Examiner* — Jonathan P Masinick
(74) *Attorney, Agent, or Firm* — Wolf, Greenfield & Sacks, P.C.

(57) ABSTRACT

A connector assembly (1) comprises an outer housing (300); and a latch (330), which is carried by the outer housing (300), to allow a coupling of the connector assembly to a corresponding counter connector. Further, the outer housing (300) is configured to receive at least one of two different types of cables (100) through a first end and at least one of two different module mating interfaces (430, 432, 434) at a second end. In another embodiment the outer housing (300) is arranged movable on an inner housing (200), and the latch (330) is rotatably arranged on the outer housing (300).

24 Claims, 9 Drawing Sheets

(51) Int. Cl.
*H01R 13/52* (2006.01)
*H01R 24/00* (2011.01)

(58) Field of Classification Search
CPC .. G02B 6/3821; G02B 6/3897; G02B 6/4219; G02B 6/426; G02B 6/4293; G02B 6/4261; H01R 13/5205; H01R 13/5804; H01R 13/5812; H01R 13/62933; H01R 13/62955; Y10T 403/591; Y10T 403/595; Y10T 403/58; Y10T 403/581
See application file for complete search history.

(56) References Cited

U.S. PATENT DOCUMENTS

| | | | |
|---|---|---|---|
| 8,272,790 | B2 | 9/2012 | Belsan et al. |
| 8,708,577 | B2 | 4/2014 | Chan et al. |
| 9,170,385 | B2 * | 10/2015 | Van Der Mee ...... G02B 6/4201 |
| 10,122,119 | B2 * | 11/2018 | Bourgeas ........... H01R 13/6275 |
| 10,177,495 | B2 * | 1/2019 | Dupeux ............... G02B 6/4278 |
| 2004/0156595 | A1 * | 8/2004 | Stockhaus ........... G02B 6/4246 385/88 |
| 2004/0192090 | A1 | 9/2004 | Flowers et al. |
| 2007/0036489 | A1 | 2/2007 | Grzegorzewska et al. |
| 2011/0123157 | A1 | 5/2011 | Belsan et al. |
| 2014/0321808 | A1 * | 10/2014 | Irwin ................... G02B 6/3879 385/56 |
| 2018/0136415 | A1 * | 5/2018 | Matsui ................ G02B 6/4293 |
| 2018/0259731 | A1 * | 9/2018 | Dupeux ............... G02B 6/423 |

FOREIGN PATENT DOCUMENTS

| | | |
|---|---|---|
| EP | 0467631 A2 | 1/1992 |
| EP | 0704937 A2 | 4/1996 |
| WO | WO 2006/101816 A1 | 9/2006 |

OTHER PUBLICATIONS

International Search Report and Written Opinion for International Application No. PCT/US2015/012624 dated Jul. 10, 2015.
International Preliminary Report on Patentability for International Application No. PCT/US2015/012624 dated Aug. 18, 2016.

* cited by examiner

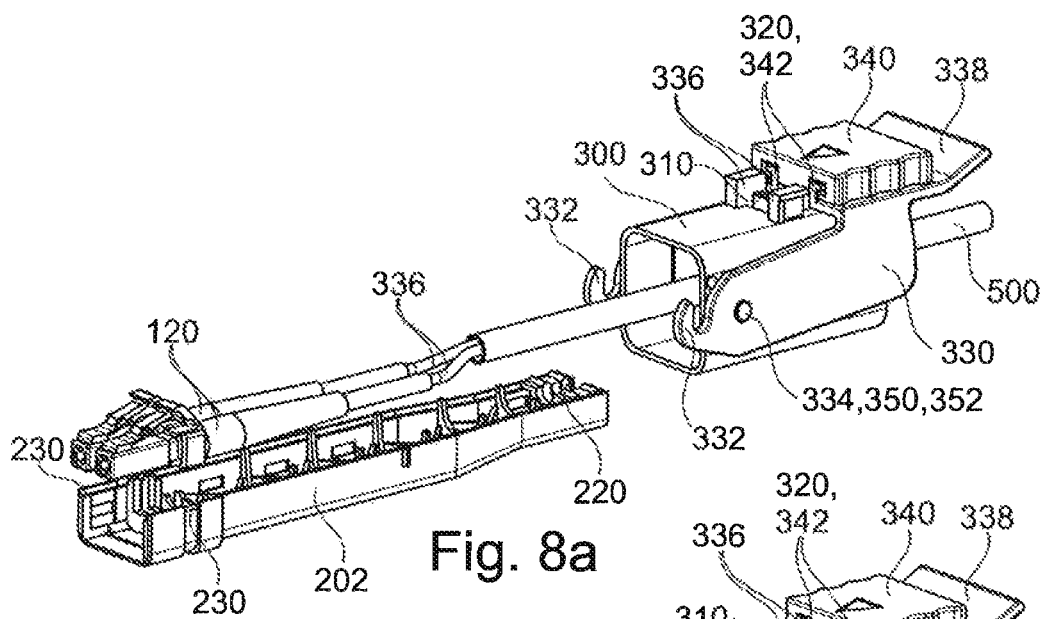
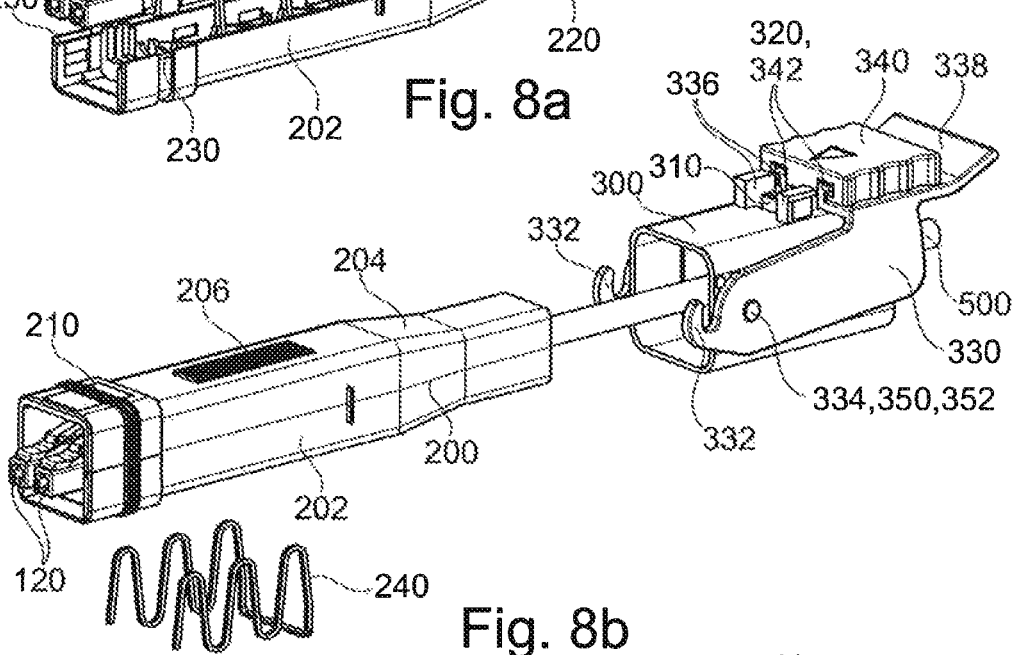
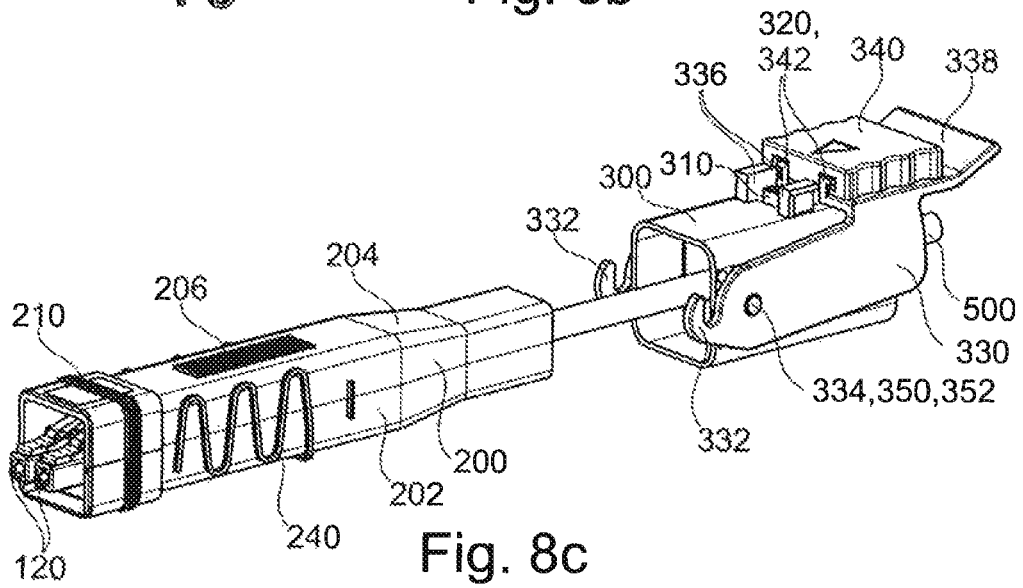

CONNECTOR ASSEMBLY

RELATED APPLICATIONS

The present application is a U.S. national stage filing under 35 U.S.C. § 371 based on International Application No. PCT/US2015/012624 entitled "CONNECTOR ASSEMBLY", filed Jan. 23, 2015, which claims priority under 35 U.S.C. § 119(e) to U.S. Provisional Application Ser. No. 61/936,479, filed Feb. 6, 2014. Both of the aforesaid applications are hereby incorporated by reference herein.

FIELD OF THE DISCLOSURE

The present disclosure relates to a connector assembly, for instance for an optical waveguide, offering an improved mating mechanism.

TECHNICAL BACKGROUND

In many electronic applications, it is necessary to connect signal and/or power lines, for example optical signal lines to electronic devices in general, to other optical signal lines or to printed circuit hoards via terminals. In particular, when electronic devices are intended to be used outdoor, specific requirements have to be fulfilled by the connector assembly, in particular concerning water resistance and/or disconnection protection issues.

SUMMARY

It is therefore an object of one aspect of the present disclosure to provide a connector assembly, which is robust in view of environmental impacts and which offers a secure connection with a corresponding counter connector.

These and other objects of the present disclosure, which will become apparent upon reading the following description, are solved by a connector assembly according to claim 1 or alternatively or additionally by a connector assembly according to claim 12.

According to one embodiment, a connector assembly is provided, comprising an outer housing and a latch, which is carried by the outer housing, wherein the outer housing is configured to receive at least one of two different types of cables through a first end and at least one of two different module mating interfaces at a second end.

The outer housing preferably encloses sensitive parts of the connector assembly like for instance tin-isolated cables, contacts and the like. This is in particular advantageous to provide a basic protection for the sensitive parts of the connector assembly from environmental impacts like dust, dirt, humidity and the like.

The latch is carried by the outer housing, preferably by at least one hinge, which is provided at the outer surface of the outer housing. The latch preferably solves the problem to lock the connector assembly at a corresponding terminal.

The outer housing is configured to receive at least one of two different types of cables through a first end of the outer housing. Preferably, the first end faces away from the terminal in the mated state. Thus, the connector assembly is not just limited to one kind of cable, but is able to receive different types of cables depending on the specific application requirements. This feature significantly increases the flexibility of the connector assembly.

It is a particular advantage of the present connector assembly that the connector assembly is flexible to be adapted to different use cases. Thus, it is possible for the first time now to use the same module mating interface in different applications, without having to change the design of the connector assembly. Thus, it is now possible to standardize the module mating interface of the connector assembly and to adapt the connector assembly to this specific use case by the type of cable which is used in the connector assembly.

Moreover, the outer housing is configured to receive at least one of two different module mating interfaces at the second end of the outer housing. Preferably, the second end is the end of the connector assembly facing to the terminal in the mated state.

Preferably, the module mating interface may be designed exchangeable, wherein the module mating interface may be preferably connected by means of a snap-in-connection releasably. At the second end, the connector assembly comprises at least two different module mating interfaces. In particular applications, it is not necessary to use all available module mating interfaces. However, in some preferred applications just one module mating interface is used. This is in particular advantageous, since the user is able to use one standardized connector assembly for many kinds of applications.

Preferably, the outer housing is waterproof.

In a preferred embodiment, the outer housing is waterproof in order to be particularly adapted to outdoor applications. The ability of being waterproof is in particular advantageous for the connector assembly when power signals or electrical signals are transmitted outside in order to avoid short-circuit faults, which possibly may destroy the connector assembly and/or an electric device to which it is connected.

Preferably, the outer housing further comprises a front seal and/or a back seal.

The front seal is preferably arranged at the above mentioned second end of the connector assembly, in order to seal the transition of the connector assembly with the terminal in order to avoid the intrusion of dirt, dust, humidity and the like. Preferably, the front seal is made of rubber which is directly molded onto the connector assembly or the front seal is applied by pushing it onto the connector assembly. The front seal helps to make the connector assembly waterproof at the second end of the outer housing. The back seal is preferably provided at the first end of the outer housing and seals the transition of the cable and the connector assembly in order to avoid the intrusion of dirt, dust, humidity and the like.

Preferably, the two different module mating interfaces pass different types of electrical energy.

As mentioned above, the connector assembly may be adapted to different kinds of applications. Preferably, the module mating interfaces pass different types of electrical energy. Thus, it is now possible to provide a solution, wherein not just one type of energy may be transmitted. This is in particular advantageous for the adaption of the connector assembly to different applications.

Preferably, the different types of electrical energy are signal and power.

Preferably, the two different module mating interfaces pass different modes of electrical energy transmission. Preferably, the different modes of electrical energy transmission are by electrical conductor and by fiber optics.

Thus, it is possible to provide an electronic device with information and power by one single connector interface. This is in particular advantageous in the outdoor use, since there has to be just one, preferably waterproof, connection to the electronic outdoor device, in order to use it. However, this feature is not just advantageous for the outdoor use. Also in indoor applications, it may be desired to provide just one cable at an electronic device for instance due to esthetic aspects and/or space aspects.

Preferably, the two different module mating interfaces are selected from the group consisting of SFP, PoE/Ethernet, 10-position-power, 2-position power, and combination Ethernet/Power.

SFP is an acronym for Small Form-factor Pluggable, PoE is an acronym for Power over Ethernet. Thus, the connector assembly may be used as a signal transmitting interface, an energy transmitting interface and/or combination thereof. Thus, preferably standardized interfaces for signal transmission and/or power transmission in a preferred connector assembly can be used. This helps to reduce the adaption efforts for the electronic devices since just the interface has to be adapted to the present connector assembly and internally the signals and/or the power may be processed like in common indoor applications. The inner housing is preferably arranged between the outer housing and the module mating interface. Thus, preferably the inner housing acts as an adapter between the outer housing and the module mating interfaces in order to use the outer housing with many different kinds of module mating interfaces. Moreover, the inner housing preferably provides a contacting member in order to equalize the ground potential between the electronic device and the cable.

Preferably, the assembly further comprises an inner housing, the inner housing being at least partially arranged in the outer housing. More preferably, the inner housing and the outer housing are separate components, which are releasably connected to each other, e.g. by means of click-fit-connectors. This is in particular advantageous for a simple and flexible assembly of the connector assembly.

Preferably, the latch is rotatably attached to the outer housing, wherein the latch rotates around a rotation axis, which is perpendicular to the mating axis of the connector assembly and wherein the latch can be rotated between an unlock state of the latch and a lock state of the latch.

In the lock state of the latch, the connector assembly is preferably locked to a terminal, with which the connector assembly is mated. In the unlocked state, the connector assembly is preferably able to be unplugged from the terminal. The attachment of the latch at the outer housing is preferably realized by means of at least one hinge more preferred by two hinges, which define the rotation axis of the latch. This is in particular advantageous, since it is possible by means of the latch to provide a mechanically simple, space saving and reliable locking of the connector assembly, in order to avoid an undesired unplugging of the connector assembly, for instance by pulling at the other end of the cable.

Preferably, the outer housing further comprises a slider, which is slidably arranged on the latch and/or the outer housing, wherein the slider can be moved between an unlock state of the slider, which allows a movement of the latch, and a lock state of the slider, in which the latch is locked in its position.

The slider preferably provides the possibility of locking the latch. Particularly preferred, the slider is able to lock the latch, when the latch is in the lock state. This is in particular advantageous in order to further reduce the risk of undesired unplugging of the connector assembly. As already mentioned above, the latch has to be rotated around the rotation axis in order to allow the connector assembly to be unmated from the corresponding terminal. This movement of the latch is disabled by the slider, then the slider is in the lock state.

Preferably, the outer housing further comprises at least one locking means adapted to cooperate with the slider, wherein the connector assembly is adapted to be releasably fixed to a terminal by a rotation of the latch from the unlock state of the latch to the lock state of the latch around the rotation axis, wherein the slider engages with the locking means of the outer housing in order to prevent the latch from rotating out of the lock state of the latch, when the slider is in its lock state.

The slider preferably prevents any rotation of the latch, when both the latch and the slider are in the lock state. The slider preferably rests on a slider guidance and a locking guidance. Herein, a slider guidance counterpart realizes a form-fit connection with both the slider guidance and the locking guidance, preferably in the form of two L-shaped profiles, which engage with each other. By this form-fit connection, the latch is prevented from being rotated out of the lock state by the form-fit connections of the slider with both the slider guidance and the locking guidance interlock. It is preferred to operate the data- and/or power-connection when both the latch and the slider are in the lock state, since it provides the maximum security from being unwillingly unplugged. Thus, in order to unplug the connector assembly, in a first step, the slider has to be moved from the lock state to the unlock state in order to unlock the latch. Then, in a second step, the latch has to be rotated from the lock state to the unlock state in order to unlock the connector assembly. Then finally, in a third step, the connector assembly can be unplugged. It is clear to the person skilled in the art, that the plugging of the connector assembly is carried out vice versa.

Preferably, the slider is guided parallel to the mating axis of the connector assembly by means of a slider guidance at the latch and by means of a slider guidance counterpart at the slider.

The slider preferably comprises a shape, which realizes a form-fit with at least a part of the latch, wherein the form-fit is realized in that the slider is still able to be moved in the direction of the mating axis. Thus, all degrees of freedom are restricted except for the movement parallel to the mating axis. This is in particular advantageous, since the slider is then no loose additional part, but an integrated member of the connector assembly, which cannot fall apart.

In an alternative solution, a connector assembly is provided, in particular for optical waveguides, comprising an inner housing and an outer housing, which is arranged movable on the inner housing, wherein the outer housing comprises locking means, a latch, which is rotatably arranged on the outer housing, wherein the latch is adapted to rotate around a rotation axis, which is perpendicular to the mating axis of the connector assembly and wherein the latch can be rotated between an unlock state of the latch and a lock state of the latch and a slider, which is slidably arranged on the latch and/or the outer housing, wherein the slider can be moved between an unlock state of the slider and a lock state of the slider, wherein the connector assembly is adapted to be releasably fixed to a terminal by a rotation of the latch from the unlock state of the latch to the lock state of the latch around the rotation axis, and the slider engages with the locking means of the outer housing in order to prevent the latch from rotating out of the lock state of the latch, when the slider is in its lock state.

The inner housing is able to be moved relative to the outer housing. This movement is in particular advantageous, in order to compensate variances of the arrangement of connector counterparts inside the terminal.

The attachment of the latch at the outer housing is preferably realized by means of at least one hinge more preferably by two hinges, which define the rotation axis of the latch. This is in particular advantageous, since it is possible by means of the latch to provide a mechanically simple, space saving and reliable locking of the connector assembly, in order to avoid an undesired unplugging of the connector assembly, for instance by pulling at the other end of the cable.

In the lock state of the latch, the connector assembly is preferably locked to a terminal, with which the connector assembly is mated. In the unlock state of the latch, the connector assembly is preferably able to be unplugged from the terminal.

The slider preferably provides the possibility of locking the latch. Particularly preferred, the slider is able to lock the latch, when the latch is in the lock state. This is in particular advantageous in order to further reduce the risk of undesired unplugging of the connector assembly. As already mentioned above, the latch has to be rotated around the rotation axis in order to allow the connector assembly to be unmated from the corresponding terminal.

The slider preferably prevents any rotation of the latch, when both the latch and the slider are in the lock state. The slider preferably rests on a slider guidance and a locking guidance. Herein, a slider guidance counterpart realizes a firm-fit connection with both the slider guidance and the locking guidance, preferably in the form of two L-shaped profiles, which engage with each other. By this form-fit connection, the latch is prevented from being rotated out of the lock state since the form-fit connections of the slider with both the slider guidance and the locking guidance interlock with each other. It is preferred to operate the data- and/or power-connection when both the latch and the slider are in the lock state, since it provides the maximum security from being unwillingly unplugged. Thus, in order to unplug the connector assembly, in a first step, the slider has to be moved from the lock state to the unlock state in order to unlock the latch. Then, in a second step, the latch has to be rotated from the lock state to the unlock state in order to unlock the connector assembly. Then finally, in a third step, the connector assembly can be unplugged. It is clear to the person skilled in the art, that the plugging of the connector assembly is carried out vice versa.

Preferably, the outer housing is adapted to slide relative to the inner housing parallel to the mating axis of the connector assembly.

This movement is preferably restricted to a range of 10 mm, more preferably 7 mm and most preferably 4 mm by the design of the inner housing and the outer housing. This movement is in particular advantageous, in order to provide a robust connection between the connector assembly and the terminal, wherein the geometric restrictions of the terminal are by far not as crucial as it is common practice for optical connectors up to now.

Preferably, the inner housing comprises a teeth area and the outer housing comprises a corresponding teeth area and wherein the teeth area of the inner housing engages with the corresponding teeth area of the outer housing, when the slider is in the lock state.

Hereby, the relative movement of the inner housing relative to the outer housing is disabled. This is in particular advantageous, because then, it is not possible anymore to disturb the data transfer by pulling the cable, since the inner housing cannot be moved away from the counterparts anymore, since it may be moved relative to the outer housing, while the outer housing is rigidly fixed at the terminal. Now, the inner housing and the outer housing are a monolithic block, wherein the inner housing is rigidly fixed to the outer housing in all degrees of freedom.

Preferably, the corresponding teeth area of the outer housing is arranged at a fastening arm, which fastening arm is fixed at one end to the outer housing and wherein the opposite end of the fastening arm is free to allow a bending movement of the arm towards the inner housing.

Preferably, the bending is an elastic bending, so that the fastening arm is bent, when a force is applied to it and the fastening arm returns to its initial position, when the force is not present anymore. This is in particular advantageous, since now the fastening arm can be used in order to provide a releasable engagement of the teeth area of the fastening arm and the teeth area of the inner housing in order to disable the relative movement of the inner housing relative to the outer housing, when the outer housing is locked at the terminal.

Preferably, the fastening arm comprises an actuating ramp facing away from the inner housing and when the slider is moved into the lock state, the slider is adapted to engage the actuating ramp, thereby bending the fastening arm towards the inner housing, such that the teeth area of the outer housing engages with the teeth area of the inner housing.

Hereby, it is now possible for the first time to provide two different locking acts by one single movement of the slider, namely the locking of the latch and the disablement of the relative movement of the inner housing relative to the outer housing, when the outer housing is locked at the terminal. Thus, additional parts of a connector assembly may be omitted, since both functions are now integrated in one component, namely the slider.

Preferably, the connector assembly further comprises a spring, arranged between the inner housing and the outer housing.

In order to compensate variances between the connector assembly and the terminal automatically, the spring is arranged between the inner housing and the outer housing, wherein the spring comprises an extension direction, which is parallel to the mating axis. The spring forces at its first end against the inner housing and at its second end against the outer housing.

Preferably, the spring is adapted such that it biases the inner housing into the mating direction of the connector assembly, when the outer housing is held fixed.

The spring forces the inner housing relative to the outer housing parallel to the mating axis in the direction towards the terminal. Thus, when the connector assembly is plugged at the terminal and the latch is in the lock state, the spring forces the inner housing and embedded fiber connectors against the counterparts inside the terminal and thus enables a robust data transfer.

Preferably, the inner housing comprises a first housing part and a second housing part, wherein an edge seal is provided between edges of the first housing part and of the second housing part.

The first housing part and the second housing part preferably embed an end of the cable and at least one fiber connector, in order to encapsulate the transition of the cable to the fiber connector and to prevent it from the intrusion of dust, dirt and/or water. One element of this encapsulation is the edge seal, which extends along the inner surface of the side walls of the first housing part of the inner housing.

Preferably, the first housing part and the second housing part are assembled by means of a snap-in connection.

The snap-in connection is preferably realized by latches and recesses. This feature allows the assembly of the inner housing without any additional tools and components, like screw drivers and additional screws. Moreover, this feature also allows the disassembly of the connector assembly without any additional tools, which is in particular advantageous for the outdoor use.

Preferably, the inner housing further comprises a front seal and/or a back seal.

The front seal is preferably arranged at a second end of the connector assembly, in order to seal the physical connection of the connector assembly with the terminal in order to avoid the intrusion of dirt, dust, humidity and the like. Preferably, the front seal is made of rubber which is directly molded onto the connector assembly or which is applied by pushing it onto the connector assembly. The front seal helps to make the connector assembly waterproof at the second end of the outer housing. The back seal is preferably provided at a first end of the outer housing and seals the physical connection of the cable and the connector assembly in order to avoid the intrusion of dirt, dust, humidity and the like.

Preferably, the slider is guided by means of a slider guidance provided on the latch and by means of a slide guidance counterpart provided on the slider.

The slider preferably rests on a slider guidance at the latch and—in the lock state—in addition on a locking guidance at the outer housing. Herein, a slider guidance counterpart at the slider realizes a form-fit connection with both the slider guidance and the locking guidance, preferably in the form of two L-shaped profiles, which engage each other. By this form-fit connection, the latch is prevented from being rotated out of the lock state since the form-fit connection with both the slider guidance and the locking guidance interlock with each other, when the slider is in the lock state.

BRIEF DESCRIPTION OF THE DRAWINGS

The present disclosure is described exemplarily with reference to the enclosed figures, in which:

FIG. 8a shows a first assembly phase of the connector assembly of the second embodiment;

FIG. 8b shows a second assembly phase of the connector assembly of the second embodiment;

FIG. 8c shows a third assembly phase of the connector assembly of the second embodiment;

DETAILED DESCRIPTION

FIGS. 1 to 5 as well as 9a, 10a and 11a relate to a first preferred embodiment of a connector assembly 1.

Figure 1:
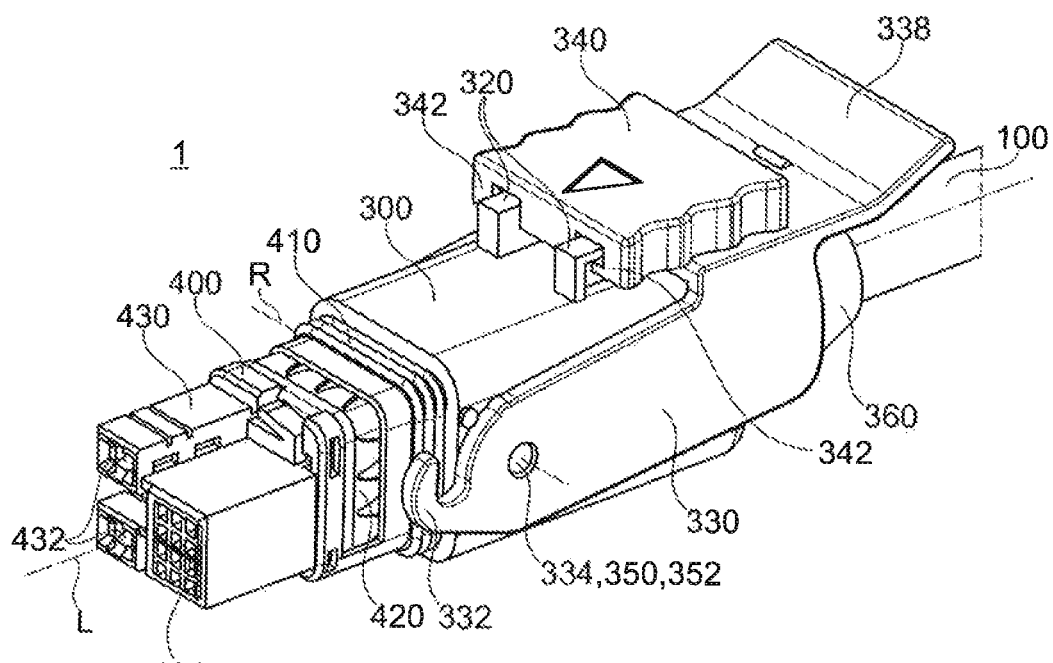
FIG. 1 shows a 3-dimensional illustration of a connector assembly of a first embodiment.
Figure 2:
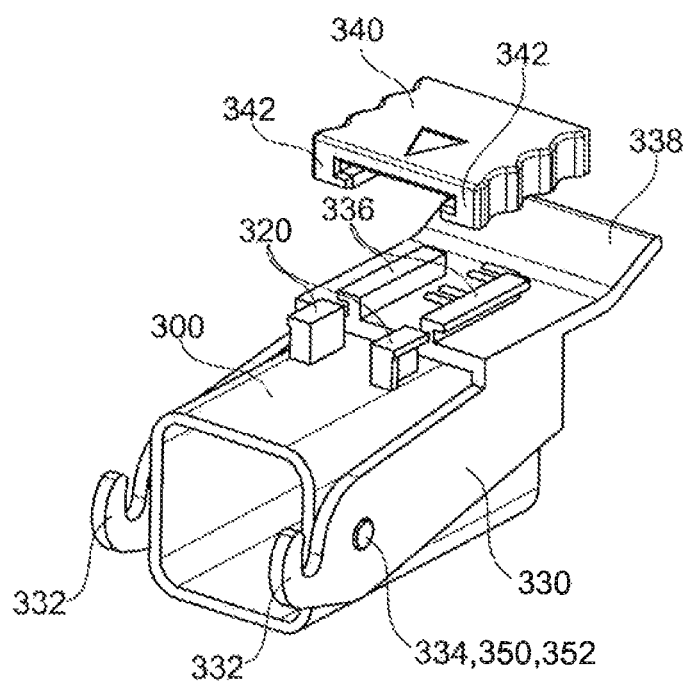
FIG. 2 shows a 3-dimensional illustration of an outer housing of the first embodiment with a latch, wherein a slider has been removed from the latch.
Figure 3:
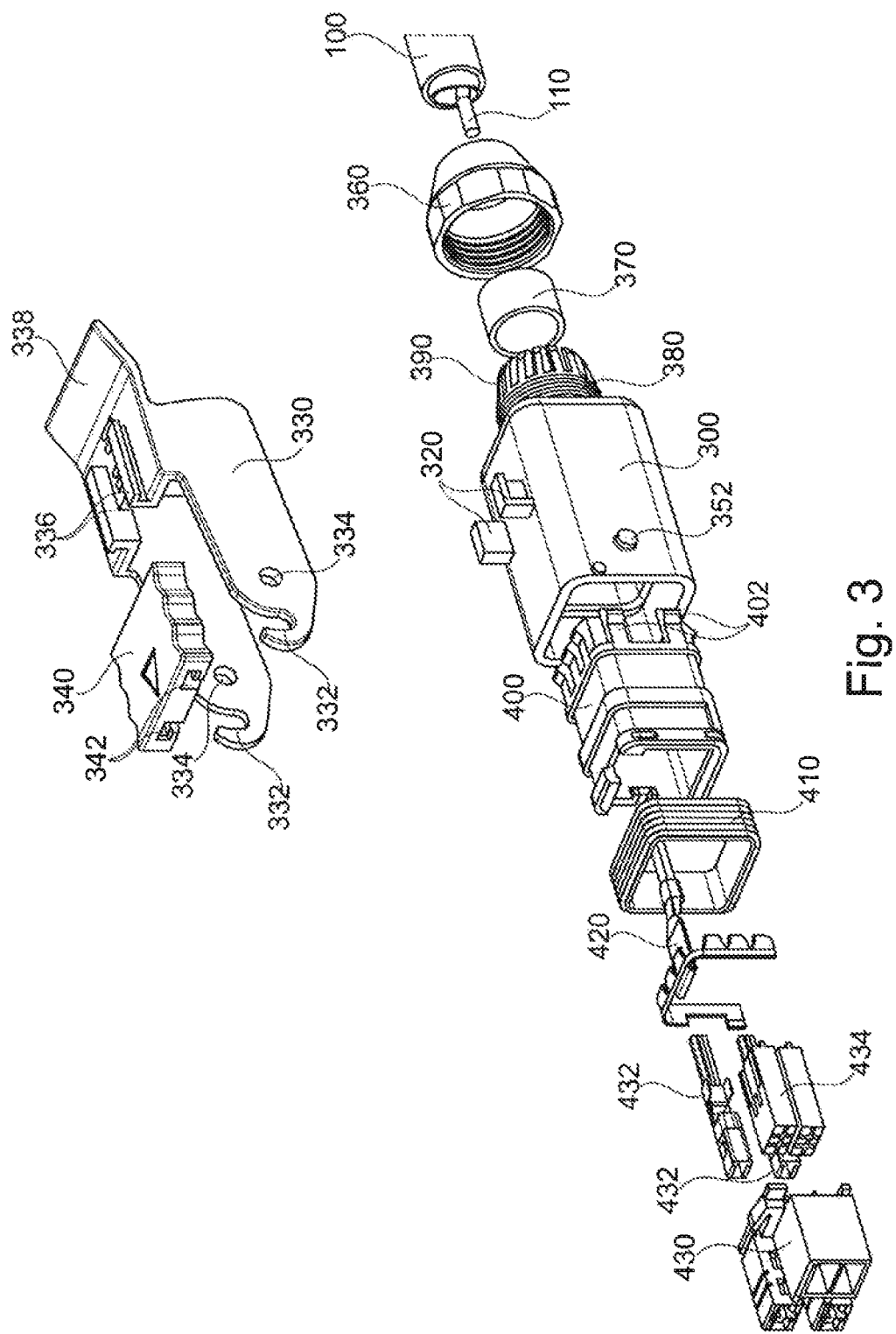
FIG. 3 shows an exploded assembly drawing of the connector assembly of the first embodiment.

FIGS. 1 to 3 show the first embodiment of the connector assembly 1 in different views. A cable 100 enters an outer housing 300 through a first end thereof. Inside the outer housing 300, the cable 100 is non-insolated and single wires 108, 112 are connected to power contacts 432 and/or to a signal contact array 434 and a braid 104 of the cable 100 is connected to a crimp braid contact 420 of the connector assembly 1.

At the first end of the outer housing 300, the outer housing comprises a strain relief 390 for the cable 100, which is fixed to the connector assembly 1 by a thread 380 at the outer housing 300 and a nut 360. Moreover, the transition from the cable 100 to the housing 300 is sealed by a back seal 370, which is arranged inside the nut 360. The back seal 370 avoids the intrusion of dust, dirt and/or humidity into the connector assembly 1.

In a second end of the outer housing 300, at least in parts an inner housing 400 is arranged. The inner housing 400 is an interface between the outer housing 300 and a module mating interface 430, which will be described below. Moreover, the inner housing supports a front seal 410, which is arranged at the transition between the outer housing 300 and the inner housing 400 and avoids the intrusion of dust, dirt and/or humidity into the connector assembly 1. However, the front seal 410 also seals the connection with a terminal 3, which will be described in detail below. Moreover, the inner housing 400 provides the crimp braid contact 420, which is arranged at the outside surface of the inner housing 400 and preferably surrounds the inner housing 400 at three of four sides.

In a second end of the inner housing 400, which faces away from the outer housing 300, the module mating interface 340 is attached. In this embodiment, the module mating interface 340 can be exchanged during the connector assembly. In this embodiment, the module mating interface 340 is attached to the inner housing 400 by pushing it into corresponding guides (not shown) at the inner housing 400 from the side, which is in FIG. 1 facing away from the viewer. The module mating interface 430 is held in position by a snap-fit-fixation, which is arranged at the top surface of the inner housing 400.

The power contacts 432 and the signal contact array 434 are kept in position at the module mating interface 430.

However, they are not rigidly fixed at the module mating interface 430, but are connected to the cable 100 and then inserted from behind during the connector assembly.

Figure 9A:
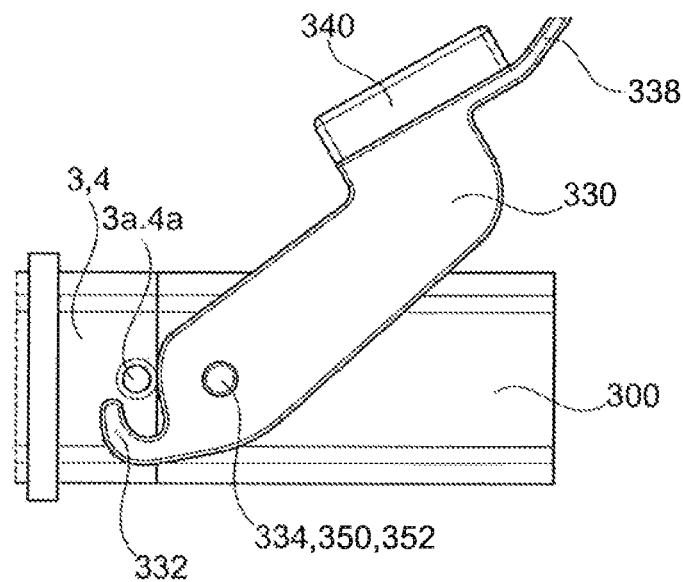
FIG. 9a shows a side view of a first connection phase of the connector assembly of the first and second embodiment with a corresponding terminal, wherein both the latch and the slider are in the unlock state.

The outer housing 300 moreover carries a latch 330 that is disposed adjacent the outer housing 300 along a transverse direction. The transverse direction is perpendicular to the mating axis L. The latch 330 comprises two arms that extend parallel to a mating axis L along two sides of the outer housing 300. The mating axis L is determined by the direction, in which the connector assembly 1, 2 is moved in order to get connected to a corresponding terminals. Each arm comprises a locking member 332, such as a hook 332, or any suitable alternative locking means as desired. Moreover, each arm comprises a hub 334 for the reception of a hinge pin 352 of the outer housing 300, in order to form a hinge 350. The two hinges 350 define a rotation axis R of the latch 330, which is can be oriented in a lateral direction that is perpendicular to both the mating axis L and the transverse direction. The latch 330 may be rotated from a lock state (as shown in FIG. 1) to an unlock state (as shown in FIG. 9a). In the lock state, the latch 330 rests on the outer housing 300. In the unlock state, the latch 330 is rotated upwards so that the latch 330 is preferably supported by the outer housing 300 just by the hinges 350.

The latch 330 furthermore comprises a handling member 338, which facilitates the gripping and the rotation of the latch 330.

Moreover, the latch 330 comprises a slider 340, which is slidably attached at the latch 330. The latch 330 comprises L-shaped slider guidances 336. The slider 340 comprises corresponding L-shaped slider guidance counterparts 342, wherein the slider guidances 336 and the slider guidance counterparts 342 engage with each other in order to fix the slider 340 in all degrees of freedom with respect to the latch 330, except for the movement of the slider 340 perpendicular to the rotation axis R.

Furthermore, the outer housing 300 comprises locking guidances 320, which are aligned with the slider guidances 336, when the latch 330 is in the lock state. Thus, it is possible in the lock state of the latch 330 to move the slider guided by the slider guidances 336 and the slider guidance counterparts 342 in the direction of the locking guidances 320 and finally to a position, wherein the slider 340 rests in parts on the slider guidances 336 and in parts on the locking guidances 320. This position is called the lock state of the slider 340. Correspondingly, the slider 340 is in an unlock state of the slider 340, when the slider 340 is just supported by the latch 330, in particular by the slider guidances 336.

Figure 4A:
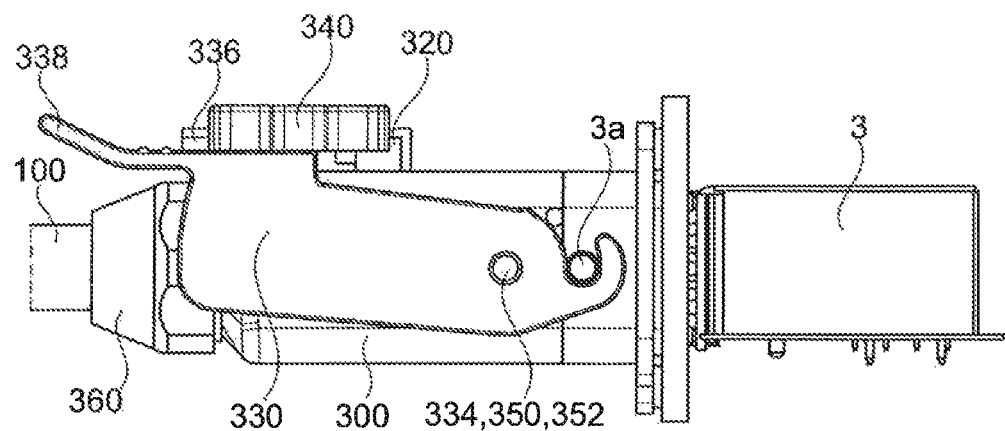
FIG. 4a shows a side view of the connector assembly of the first embodiment, wherein the connector assembly is connected to and locked at a terminal.
Figure 4B:
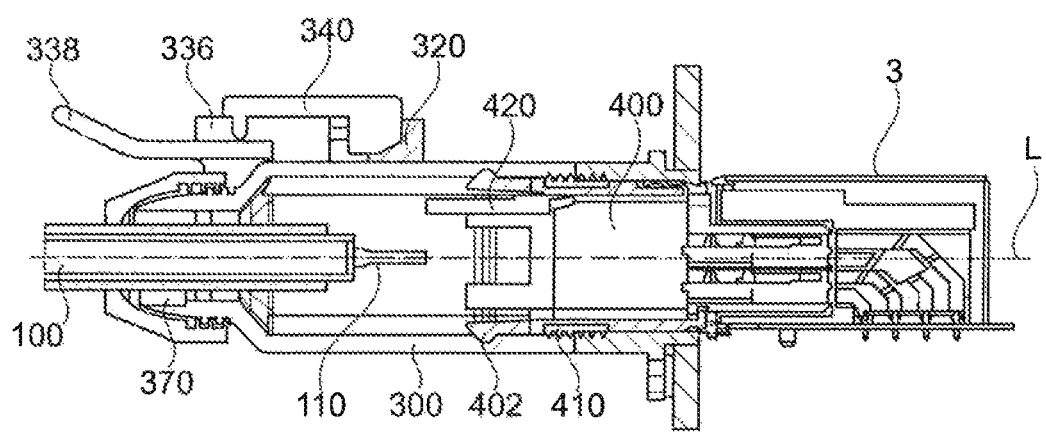
FIG. 4b shows the connector assembly of FIG. 4a in a cross-sectional view.

FIGS. 4a and 4b show a side view and a cross-sectional view of the connector assembly 1, wherein the connector assembly 1 is connected to and locked at the terminal 3. In FIGS. 4a and 4b, both the latch 330 and the slider 340 are in the lock state. The connector assembly 1 is mated with the terminal 3. Herein, the terminal 3 is a terminal of an electronic device, which is connected to a printed circuit board (not shown) inside the electronic device (not shown). The terminal 3 comprises terminal locks 3a, which engage with the hooks 332 of the connector assembly 1 in order to prevent the connector assembly 1 from being unplugged. As already mentioned above, the slider 340 is in the lock state, wherein the slider 340 rests in parts on the slider guidances 336 and in parts on the locking guidances 320. In this position of the slider 340, the latch 330 is not able to rotate around the rotation axis R. Thus, it is not possible to disconnect the connector assembly 1 from the terminal 1, while the slider 340 is in the lock state.

FIG. 4b shows a cross-sectional view of the arrangement of FIG. 4a. For the sake of convenience, the single wires between the cable 100 and the power contacts 432 and the signal contact array 434, respectively, have been omitted.

As it is shown in FIGS. 3 and 4b, the back seal 370 comprises a torus-like shape and surrounds the cable 100. The back seal 370 is pressed by the nut 360 and the strain relief 390 onto the cable and thus seals the transition.

As mentioned above, front seal 410 is arranged around the inner housing 400, in particular, the front seal 410 is arranged in a specific ring-shaped recess around the inner housing 400. The front seal 410 both seals the transition from the outer housing 300 to the inner housing 400 and from the inner housing 400 to the terminal 3.

In the following a short description of the assembly of the connector assembly 1 of the first embodiment will be given:

In a first step, the nut 360, the back seal 370 and the outer housing 300 are moved over the cable 100.

In a second step, the front seal 410 and the crimp braid contact 420 are arranged at the inner housing 400.

In a third step, the module mating interface 430 is slid from the side onto the terminal-sided end of the inner housing 400.

In a fourth step, the braid 104 is crimped to the crimp braid contact 420, and the other leads are connected to the power contacts 432 and/or respectively to the signal contact array 434.

In a fifth step, the group consisting of the inner housing 400, front seal 410, the crimp braid contact 420 and the module mating interface 430 is attached inside the outer housing by a snap-in lock 402, wherein the power contacts 432 and/or the signal contact array 434 are moved through corresponding openings in the module mating interface 430.

In a sixth step, the back seal 370 and the nut 360 are moved on the cable 100 towards the outer housing 300. The nut engages with a thread 380 at the inner housing 380 and presses strain relief arms against the back seal 370 and the cable 100 and, thus, fixes the cable in its position.

In a seventh step, the latch 330 is attached at the outer housing 300 and the slider 340 is attached at the latch 330.

The outer housing 300, the latch 330, the slider 340, the nut 360, the inner housing 400 and the module mating interface 430 are made of polymer materials, the back seal 370 and the front seal 410 are preferably made of rubber and the crimp braid contact 420 and the power contacts 432 are made of metal. In the signal contact array 434, contact pins are made of metal, which are surrounded by a polymer matrix.

Figure 5:
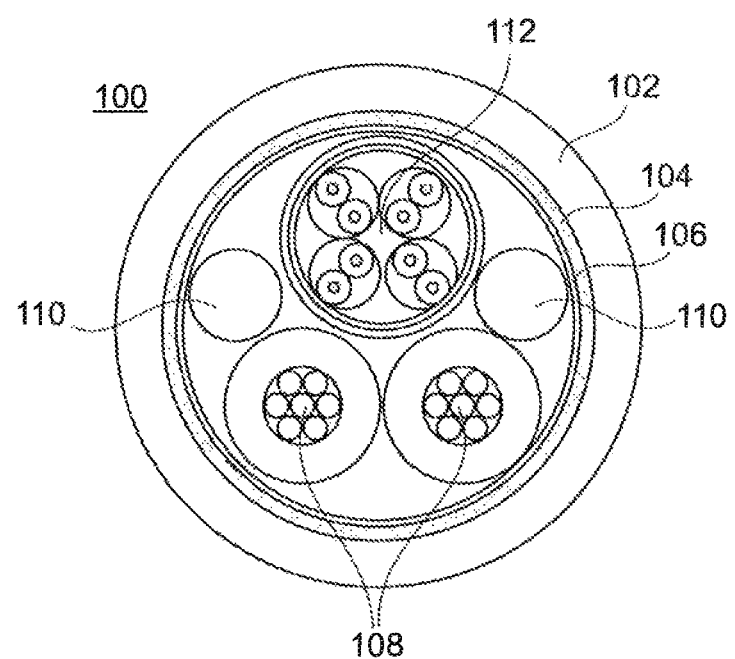
FIG. 5 shows a cross-sectional view of a multi-purpose cable for the use with the connector assembly of the first embodiment.

FIG. 5 shows a cross-sectional view of a multi-purpose cable 100 for the use with the connector assembly 1 of the first embodiment. The cable 100 comprises two power lines 108 for the power supply of the connected electronic device. Moreover, the cable 100 comprises a data cable 112 with four line pairs, in order to provide signals to the connected electronic device. In order to hold the power lines 108 and the data cable 112 in place during operation, the cable 100 further comprises two filler cords 110. The power lines 108, the data cable 112 and the filler cords 110 are surrounded by a PET-tape 106. The PET-taped bundle is surrounded by a braid 104, in order to protect in particular the signal lines from environmental interferences. Finally, a polymer jacket 102 protects the cable 100 from dust, dirt, humidity and the like.

Figure 9B:
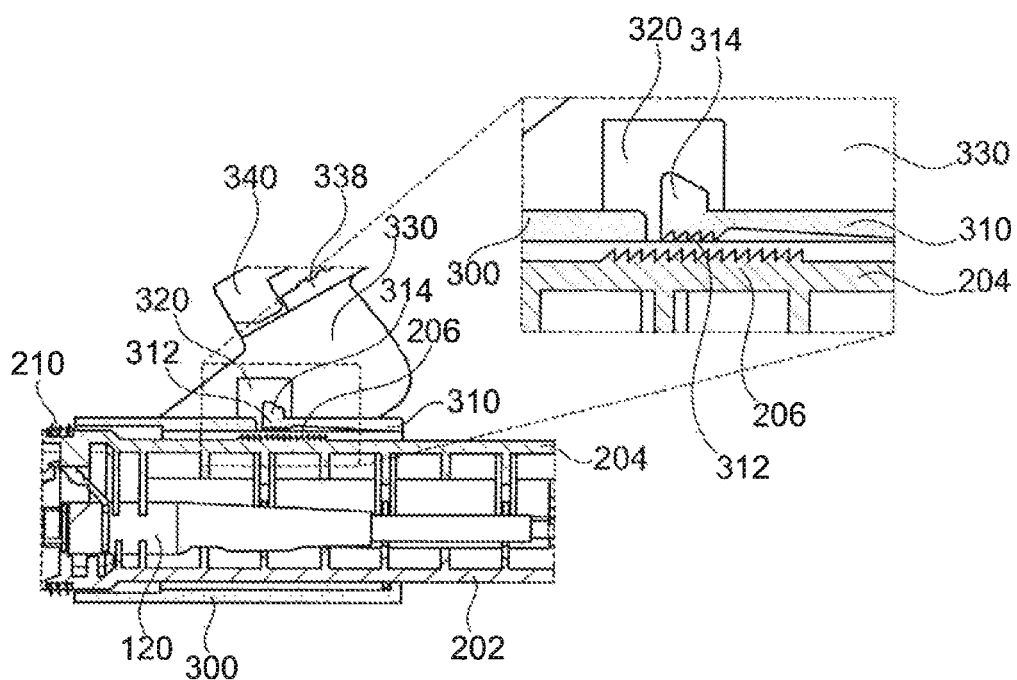
FIG. 9b shows a cross-sectional view of the first connection phase of the connector assembly of the second embodiment with the corresponding terminal.
Figure 10A:
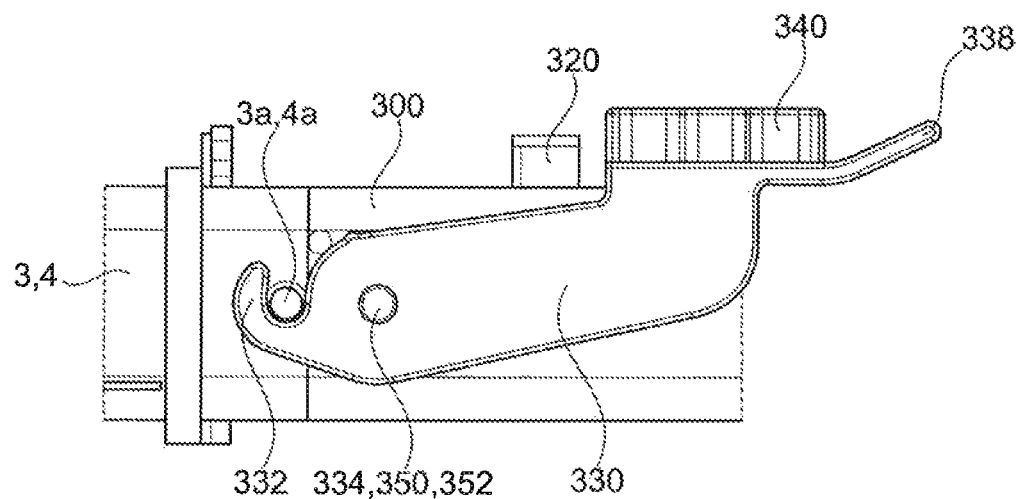
FIG. 10a shows a side view of a second connection phase of the connector assembly of the first and second embodiment with the corresponding terminal, wherein the latch is in the lock state and the slider is in the unlock state.
Figure 10B:
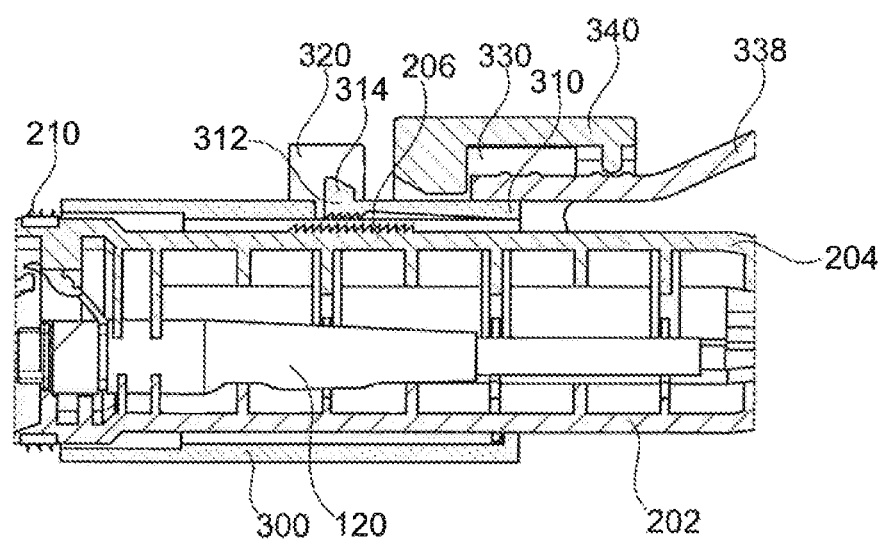
FIG. 10b shows a cross-sectional view of the second connection phase of the connector assembly of the second embodiment with the corresponding terminal.
Figure 11A:
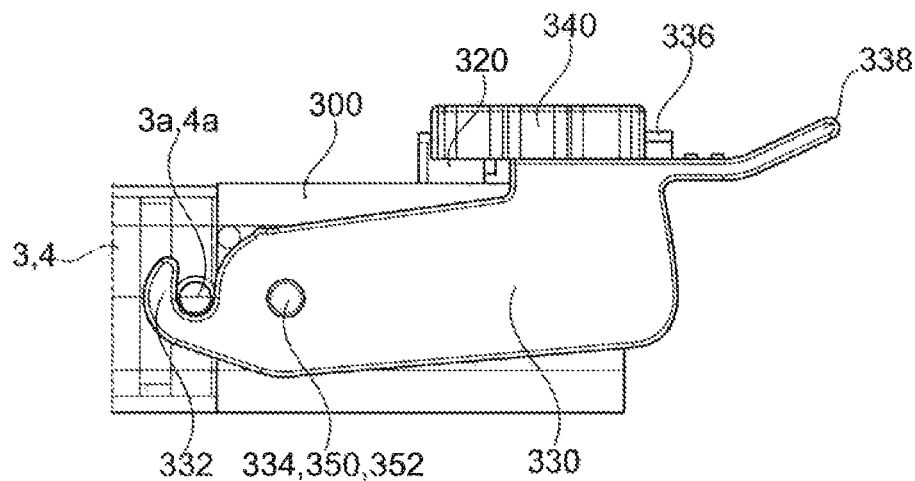
FIG. 11a shows a side view of a third connection phase of the connector assembly of the first and second embodiment with the corresponding terminal, wherein both the latch and the slider are in the lock state.

The FIGS. 6 to 8c, 9b, 10b and 11b show a second embodiment of a connector assembly 2, wherein the second embodiment is a separate solution of the above mentioned technical problem. The explanations concerning FIGS. 9a, 10a and 11a are valid for both embodiments.

Figure 6:
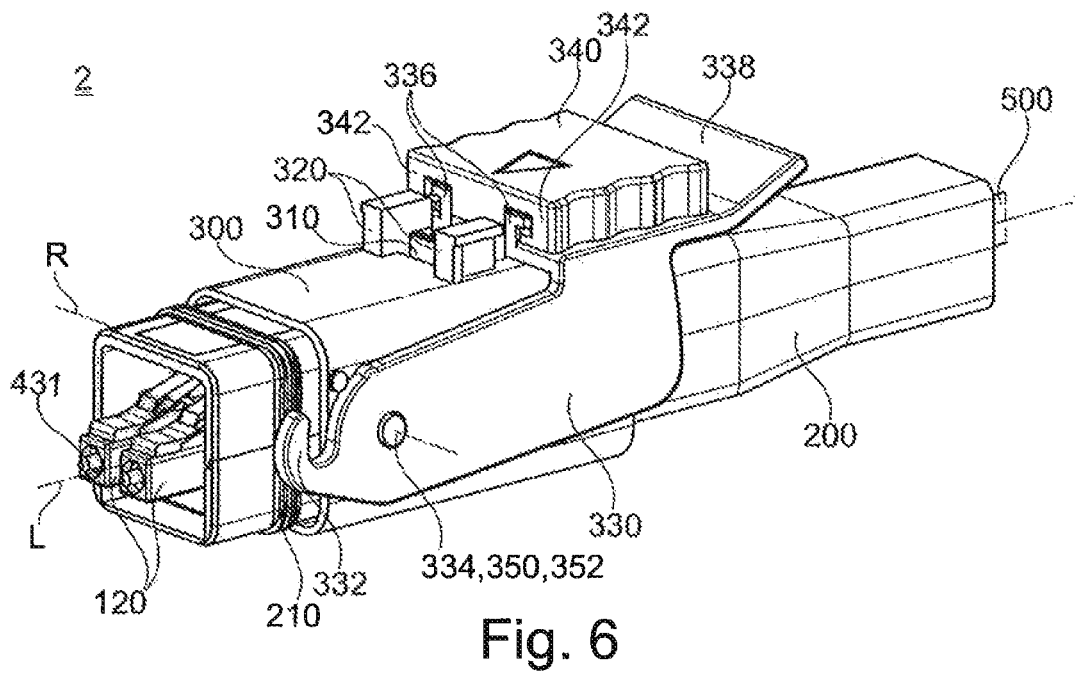
FIG. 6 shows a 3-dimensional illustration of a connector assembly of a second embodiment.
Figure 7:
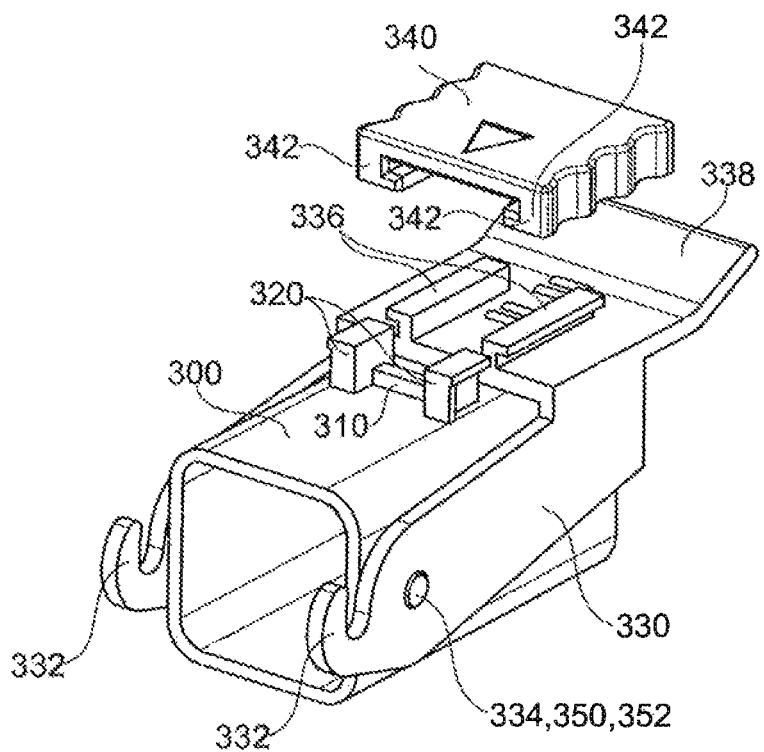
FIG. 7 shows a 3-dimensional illustration of an outer housing of the second embodiment with a latch, wherein a slider has been removed from the latch.

FIGS. 6 and 7 show the second embodiment of the connector assembly 2 in different views. A cable 500, preferably a glass fiber cable with two signal lines enters an inner housing 200 through a first end thereof. Inside the inner housing 200, the cable 500 is non-insulated and single fibers are connected to fiber connectors 120, as it will be described below. Mating ends of the fiber connectors 120 are disposed at a module mating interface 431 of the connector assembly 2.

The cable 500 preferably comprises two fibers and a surrounding aramid yarn, which is surrounded by a polymer jacket.

The inner housing 200 is slidingly enclosed by an outer housing 300, wherein the outer housing is able so slide at the inner housing 20 in a mating direction L of the connector assembly 2.

The outer housing 300 of the second embodiment can carry a fastening arm 310, which is preferably arranged between locking guidances 320. The design and the effect of the fastening arm 310 will be described in more detail below.

As described above with respect to the connector assembly 1, the inner housing 400 can be disposed at an interface between the outer housing 300 and the module mating interface 430. Thus, the module mating interface 430 can be disposed forward with respect to a front end of the inner housing 400 along the mating axis L. Further, the front end of the inner housing 400 can be disposed forward with respect to a front end of the outer housing 300 along the mating axis L. Thus, the module mating interface 430 can be disposed forward with respect to the front end of the outer housing 300. For instance, the inner housing 400 can extend forward from the front end of the outer housing 300. The module mating interface 430 can extend forward from the front end of the inner housing 400.

Similarly, the inner housing 200 can be disposed at an interface between the outer housing 300 and the module mating interface 431. Thus, the module mating interface 431 can be disposed forward with respect to a front end of the inner housing 200 along the mating axis L. Further, the front end of the inner housing 200 can be disposed forward with respect to a front end of the outer housing 300 along the mating axis L. Thus, the module mating interface 431 can be disposed forward with respect to the front end of the outer housing 300. For instance, the inner housing 200 can extend forward from the front end of the outer housing 300. The module mating interface 431 can extend forward from the front end of the inner housing 200.

The module mating interface 431 of the connector assembly 2 can include the mating ends of at least one fiber connector 120. For instance, the module mating interface 431 can include respective mating ends of the fiber connectors 120. The fiber connectors 120 can be configured as a pair of fiber connectors. The mating ends of the fiber connectors 120 can be spaced from each other along the lateral direction. Alternatively, the module mating interface 430 of the connector assembly 1 can include at least one power contacts 432. For instance, the module mating interface 430 can include the power contacts 432. The power contacts 432 can be configured as a pair of power contacts. The mating ends of the power contacts can be spaced from each other along the transverse direction. Thus, the outer housing 300 can support two different module mating interfaces having mating ends that are spaced from each other in different directions. The different directions can be perpendicular directions. Alternatively or additionally, the module mating interface 430 of the connector assembly 1 can include the signal contact array 434. The signal contact array 434 can be defined by respective mating ends of a plurality of signal contacts. Thus, the module mating interface 430 can include respective mating ends of a plurality of signal contacts. The module mating interface 430 can be referred to as a first module mating interface, and the module mating interface 431 can be referred to as a second module mating interface.

It should thus be appreciated that the module mating interface 430 of the first connector assembly 1 includes a first mating end of a first at least one conductor, which can be configured as a first plurality of mating ends of a respective first plurality of conductors. The first plurality of conductors can include power contacts and signal contacts. Thus, the first plurality of conductors can include electrical conductors. Thus, the first plurality of conductors can be configured to carry electrical power, electrical signals, or a combination of electrical power and electrical signals. All of the conductors of the first plurality of electrical conductors are configured to mate with a first complementary receptacle of a complementary electrical component, such as the terminal 3. That is, the conductors of the first plurality of electrical conductors are configured to all be received simultaneously in the respective receptacles of the first complementary electrical component.

The module mating interface 431 of the connector assembly 2 includes a second mating end of a second at least one conductor, which can be configured as a second plurality of mating ends of a respective second plurality of conductors. The second plurality of conductors can include optical conductors configured to carry signals data. The signal data can be optical signal data. All of the conductors of the second plurality of conductors are configured to mate with a complementary receptacle of a second complementary electrical component, such as the terminal 4. That is, the conductors of the second plurality of electrical conductors are configured to all be received simultaneously in the respective receptacles of the second complementary electrical component. It should be appreciated that the conductors of the second plurality of conductors are not mating compatible with the first complementary electrical component. That is, the conductors of the second plurality of electrical conductors are not configured to all be received simultaneously in the respective receptacles of the first complementary electrical component. Similarly, the conductors of the first plurality of conductors are not mating compatible with the second complementary electrical component. That is, the conductors of the first plurality of electrical conductors are not configured to all be received simultaneously in the respective receptacles of the second complementary electrical component.

The front end of the outer housing 300 of the first connector assembly 1 can surround the module mating interface 430 with respect to a view of the front end of the outer housing 300 along the mating axis L. Thus, the front end of the outer housing 300 can surround all conductors of the module mating interface 430 with respect to a view of the front end of the outer housing 300 along the mating axis L. For instance, the front end of the outer housing 300 can be disposed outward of the module mating interface 430 along a plane defined by the lateral and transverse directions, even though the module mating interface 430 is spaced from the front end of the outer housing 300 along a direction parallel to the mating axis L. Similarly, the front end of the outer housing 300 of the second connector assembly 2 can surround the module mating interface 431 with respect to a view of the front end of the outer housing 300 along the mating axis L. Thus, the front end of the outer housing 300 can surround all conductors of the module mating interface 431 with respect to a view of the front end of the outer housing 300 along the mating axis L. For instance, the front end of the outer housing 300 can be disposed outward of the module mating interface 431 along a plane defined by the lateral and transverse directions, even though the module mating interface 431 is spaced from the front end of the outer housing 300 along a direction parallel to the mating axis L. The front end of the outer housing 300 of the first connector assembly 1 can be identical to the front end of the outer housing 300 of the second connector assembly 2. For instance, the front end of the outer housing 300 of the first connector assembly 1 can have the same size and shape as the front end of the outer housing 300 of the second connector assembly 2.

Moreover, the inner housing 200 supports a front seal 210, which is arranged at a circumference of the inner housing 200 in front of the outer housing 300 as seen in the mating direction starting from the cable 500.

The outer housing 300 moreover carries a latch 330. The latch 330 comprises two arms that extend parallel to a mating axis L along two sides of the outer housing 300. The mating axis L is determined by the direction, in which the connector assembly 2 is moved in order to get connected to a corresponding terminal 4. Each arm comprises a locking member 332, such as a hook 332, or any alternative suitable locking means. Moreover, each arm comprises a hub 334 for the reception of a hinge pin 352, in order to form a hinge 350. The two hinges 350 define a rotation axis R of the latch 330, which can be oriented in the lateral direction. The latch 330 may be rotated from a lock state (as shown in FIG. 6) to an unlock state (as shown in FIG. 9a). In the lock state, the latch 330 rests on the outer housing 300. In the unlock state, the latch 330 is rotated upwards so that the latch 330 is preferably supported by the outer housing just by the hinges 350.

The latch 330 furthermore comprises a handling member 338, which facilitates the gripping and the rotation of the latch 330.

Moreover, the latch 330 comprises a slider 340, which is slidably attached at the latch 330. The latch 330 comprises L-shaped slider guidances 336. The slider 340 comprises corresponding L-shaped slider guidance counterparts 342, wherein the slider guidances 336 and the slider guidance counterparts 342 engage with each other in order to fix the slider 340 in all degrees of freedom with respect to the latch 330, except for the movement of the slider 340 perpendicular to the rotation axis R.

Furthermore, the outer housing 300 comprises locking guidances 320, which are aligned with the slider guidances 336, when the latch 330 is in the lock state. Thus, in the lock state of the latch 330 it is possible to move the slider guided by the slider guidances 336 and the slider guidance counterparts 342 in the direction of the locking guidances 320 and finally to a position, wherein the slider 340 rests in parts on the slider guidances 336 and in parts on the locking guidances 320. This position is called the lock state of the slider 340. Correspondingly, the slider 340 is in an unlock state of the slider 340, when the slider 340 is just supported by the latch 330, in particular by the slider guidances 336.

Referring to FIGS. 8a to 8c a short description of the assembly of the connector assembly 2 of the second embodiment will be given.

In a first step, the jacket of the cable 500 is removed for a defined length of the cable 500.

In a second step, protective tubes are pushed over the fibers and a shrink sleeve seals the transition from the jacket to the single fibers with the protective tubes.

In a third step, the yarn of both protective sleeves and the fiber cable is covered by the shrink sleeve. Then, the shrink sleeve is shrinked by heating it up and the inside glue preferably glues all yarns together.

In a fourth step the fibers are terminated, by fiber connectors 120, preferably by a duplex LC connector.

In a fifth step, the outer housing 300 with the attached latch 330 and the attached slider 340 is moved over the fiber connectors 120 and the cable 500.

In a sixth step, the fiber connectors 120 and the end of the jacket of the cable 500 are embedded in a first housing part 202 of the inner housing 200.

The first housing part of the inner housing preferably comprises a back seal 220, which is directly molded in the first housing part 202 of the inner housing 200. The first housing part 202 of the inner housing 200 furthermore comprises edge seals 230, which extend along the inner surface of the side walls of the first housing part 202 of the inner housing 200.

In a seventh step, a second housing part 204 of the inner housing 200 is attached to the first housing part 202 of the inner housing 200, preferably by snap-lock-connectors.

The first and second housing parts 202, 204 form the inner housing 200. The second housing part 204 of the inner housing 200 comprises at its upper outer surface a teeth area 206. The effect of the teeth area 206 will be described in more detail below.

In an eighth step, a front seal 210 is attached at the inner housing 200.

In a ninth step, a spring 240 is attached at the inner housing 200.

The spring 240 biases the inner housing 200 into the mating direction, when the connector assembly is connected at the terminal 4.

In a tenth step, the outer housing 300 with the attached latch 330 and the attached slider 340 is moved over the cable 500 and the inner housing 200, until it passes a blocker member, which prevents the outer housing 300 to be moved back again off the inner housing 200.

As already mentioned above, FIGS. 9b, 10b and 11b relate exclusively to the second embodiment, while the explanations concerning FIGS. 9a, 10a and 11a are valid for both embodiments.

In FIG. 9a the first connection phase of the connector assembly 1, 2 with the terminal 3, 4 is shown. Herein, the connector assembly 1, 2 is already plugged into the terminal 3, 4 and both the latch 330 and the slider 340 are in the unlock state. The latch 330 is rotated around the hinges 350 so that the back part of the latch 330 is moved upwards and the front part with the hooks 332 is moved downwards. Thus, the hooks 332 do not get in contact with the terminal locks 3a, 4a, while the connector assembly 1, 2 is plugged into the terminal 3, 4. The connector assembly 1, 2 is free to be unplugged from the terminal 3, 4, if desired.

In FIG. 10a, the second connection phase of the connector assembly 1, 2 with the terminal 3, 4 is shown. Herein, the connector assembly 1, 2 is already plugged into the terminal 3, 4, wherein the latch 330 is in the lock state and the slider 340 is in the unlock state. In view of FIG. 9a, the latch 330 is rotated around the hinges 350 so that the back part of the latch 330 is moved downwards and the front part with the hooks 332 is moved upwards. As a consequence, the hooks 332 engage with the terminal locks 3a, 4a and thus prevent the connector assembly 1, 2 from being unplugged from the terminal 3, 4. However, the latch 330 is still free to rotate around the hinges 350, if a corresponding force impacts on the latch 330.

In FIG. 11*a*, the third connection phase of the connector assembly 1, 2 with the terminal 3, 4 is shown. Herein, the connector assembly 1, 2 is already plugged into the terminal 3, 4, wherein both the latch 330 and the slider 340 are in the lock state. In view of FIG. 10*a*, the slider 340 is moved in the mating direction towards the terminal 3, 4. As already mentioned above, the slider 340 rests on the slider guidance 336 and the locking guidance 320. Herein, the slider guidance counterpart 342 realizes a form-fit connection with both the slider guidance 336 and the locking guidance 320, preferably in the form of two L-shaped profiles, which engage each other. By this form-fit connection, the latch 330 is prevented from being rotated out of the lock state since the form-fit connection with both the slider guidance 336 and the locking guidance 320 interlock with each other by the slider. The third state is the preferred state for the operation of the data- and/or power-connection, since it provides the maximum security from being unwillingly unplugged.

In view of FIGS. 9*b*, 10*b* and 11*b*, the effect of the fastening arm 310 and the teeth area 206 at the inner housing 200 of the second embodiment will be described in detail:

As already mentioned above, the inner housing is able to be moved relative to the outer housing 300. This movement is preferably restricted to a range of 10 mm, more preferably 7 mm and most preferably 4 mm by the design of the inner housing 200 and the outer housing 300. This movement is in particular advantageous, in order to compensate variances of the arrangement of connector counterparts inside the terminal 4.

In order to compensate these variances automatically, the spring 240 is arranged between the inner housing 200 and the outer housing 300, wherein the spring comprises an extension direction, which is parallel to the mating axis L. The spring 240 forces at its first end against the inner housing 200 and at its second end against the outer housing 300. The spring 240 forces the inner housing 200 relative to the outer housing 300 parallel to the mating axis L in the direction towards the terminal 4. Thus, when the connector assembly 2 is plugged at the terminal 4 and in the lock state of the latch 330, the spring forces the inner housing 200 and the embedded fiber connectors 120 against the counterparts inside the terminal 4 and thus enables a data transfer. Just for the sake of convenience, the spring 240 is not shown in FIGS. 9*b*, 10*b*, 11*b*.

However, when the connector assembly 2 is plugged at the terminal 4 and the latch 330 is in the lock state of the latch 330, it is still possible to disturb the data transfer by pulling the cable 500, since the inner housing 200 will then be moved away from the counterparts, since it may be moved relative to the outer housing 300, while the outer housing is rigidly fixed at the terminal 4. In order to avoid this relative movement, the fastening arm 310 is provided.

The fastening arm 310 can be integrally formed at the outer housing 300 or otherwise supported by the outer housing 300, wherein a first end of the fastening area 310, which faces towards the terminal 4, is free to rotate (in the following: "free end") around a transition area between the outer housing 300 and the fastening arm 310, wherein the transition area is arranged at the end of the fastening arm 310, which faces away from the terminal 4.

As shown in FIG. 9*b*, the free end comprises at its outer surface an actuating ramp 314 and at its inner surface a teeth area 312. The teeth area 312 of the fastening arm 310 is arranged above the teeth area 206 at the inner housing 200, but they preferably do not get in contact with each other during the first and second connection phase of the connector assembly 2 or in other words: they preferably do not get in contact with each other until the slider 340 is in the unlock state.

Figure 11B:
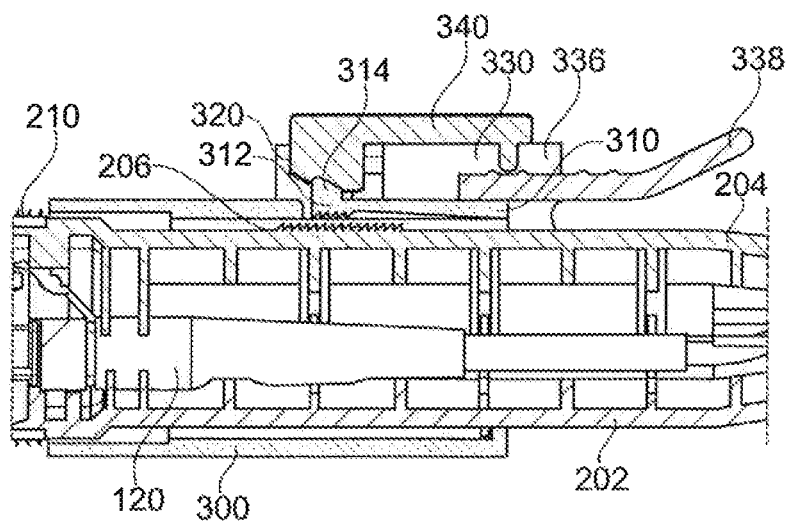
FIG. 11b shows a cross-sectional view of the third connection phase of the connector assembly of the second embodiment with the corresponding terminal.

As indicated in FIG. 11*b*, when the slider 340 is moved into the lock state, the slider 340 is adapted to engage the actuating ramp 314 thereby bending the fastening arm 310 towards the inner housing 200, such that the teeth area 312 of the outer housing 300 engages with the teeth area 206 of the inner housing 200.

As it is clear to the person skilled in the art, the calculation of bending movements is very time- and calculation-power-intensive. Thus, the common measure is used in FIG. 11*b*, to present the fastening arm 310 in an unbended state and overlapping with the slider 340, which is of course not possible in reality, since in reality the fastening arm 310 is bended towards the inner housing 200, such that the teeth area 312 of the outer housing 300 engages with the teeth area 206 of the inner housing 200.

By the engagement of the teeth areas 312 and 206, the ability of the inner housing 200 to move relative to the outer housing 300 is gone. Now, the inner housing 200 and the outer housing 300 are a monolithic block, wherein the inner housing 200 is rigidly fixed to the outer housing in all degrees of freedom.

The bending of the fastening arm 310 is an elastic bending. Thus, when the slider 340 is moved to the unlock state, the fastening arm 310 relaxes and moves back in its initial position, in which the teeth areas 312 and 206 are not engaged with each other and the inner housing 200 is able to be moved relative to the outer housing 300 within the defined range of movement as mentioned above.

The skilled person will recognize that the expressions left, right, up or down and the like that may be used in the present description are only for illustrative purposes, since the shown embodiments of connector assemblies can be arranged in any spatial orientation.

The invention claimed is:

1. A connector assembly, comprising:
    a housing;
    at least one cable received through a first end of the housing;
    a mating interface at a second end of the housing;
    a latch rotatably attached to the housing to releasably fix the connector assembly to a terminal; and
    a slider slidably attached to the latch and configured to lock and unlock the latch.

2. The connector assembly according to claim 1, wherein the housing is waterproof.

3. The connector assembly according to claim 2, further comprising a back seal positioned within a nut at the first end of the housing.

4. The connector assembly according to claim 1, wherein:
    the outer housing is configured to receive at least one of two different module mating interfaces at a second end; and
    the mating interface comprises a plurality of signal contacts and a plurality of power contacts.

5. The connector assembly according to claim 1, wherein the mating interface is a small form-factor pluggable (SFP) interface.

6. The connector assembly according to claim 1, wherein the assembly further comprises:
    an inner housing at least partially arranged in the housing; and
    a front seal disposed around the inner housing.

7. The connector assembly according to claim 1, wherein:
the first and second ends of the housing are separated along a first axis;
the slider is configured to lock the latch by sliding along the first axis in a first direction; and
the slider is configured to unlock the latch by sliding along the first axis in a second direction opposite the first direction.

8. The connector assembly according to claim 7, wherein the slider is configured to prevent rotation of the latch when the slider locks the latch.

9. The connector assembly according to claim 8, wherein:
the latch is configured to releasably fix the connector assembly to the terminal when the latch is rotated about a second axis perpendicular to the first axis in a third direction; and
the latch is configured to release the connector assembly from the terminal when the latch is rotated about the second axis in a fourth direction opposite the third direction.

10. A connector assembly, comprising:
an outer housing; and
a latch, which is carried by the outer housing, wherein the outer housing is configured to receive at least one of two different types of cables through a first end and at least one of two different module mating interfaces at a second end,
wherein the latch rotates around a rotation axis, which is perpendicular to a mating axis of the connector assembly and wherein the latch can be rotated between an unlock state of the latch and a lock state of the latch, and
wherein the connector assembly further comprises a slider, which is slidably arranged on the latch and/or the outer housing, wherein the slider can be moved between an unlock state of the slider, which allows a movement of the latch, and a lock state of the slider, in which the latch is locked in its position.

11. The connector assembly according to claim 10, wherein:
the two different module mating interfaces pass different types of electrical energy, the different types of electrical energy including signal and power.

12. The connector assembly according to claim 10, wherein:
the different module mating interfaces pass different modes of electrical energy.

13. The connector assembly according to claim 12, wherein the different modes of electrical energy are transmitted by electrical conductor and by fiber optics.

14. The connector assembly according to claim 10, wherein the outer housing further comprises at least one locking member adapted to cooperate with the slider; and wherein
the connector assembly is adapted to be releasably fixed to a terminal by a rotation of the latch from the unlock state of the latch to the lock state of the latch around the rotation axis, and wherein
the slider engages with the locking member of the outer housing in order to prevent the latch from rotating out of the lock state of the latch, when the slider is in its lock state.

15. The connector assembly according to claim 14, wherein the slider is guided parallel to the mating axis of the connector assembly by a slider guidance at the latch and by a slider guidance counterpart at the slider.

16. A connector assembly, in particular for optical waveguides, comprising:
an inner housing and
an outer housing, which is arranged movable on the inner housing, wherein the outer housing comprises a locking member;
a latch, which is rotatably arranged on the outer housing, wherein the latch is adapted to rotate around a rotation axis, which is perpendicular to the mating axis of the connector assembly and wherein the latch can be rotated between an unlock state of the latch and a lock state of the latch; and
a slider, which is slidably arranged on the latch and/or the outer housing, wherein the slider can be moved between an unlock state of the slider and a lock state of the slider, wherein
the connector assembly is adapted to be releasably fixed to a terminal by a rotation of the latch from the unlock state of the latch to the lock state of the latch around the rotation axis (R), and
the slider engages with the locking member of the outer housing in order to prevent the latch from rotating out of the lock state of the latch, when the slider is in its lock state.

17. The connector assembly according to claim 16, wherein the outer housing is adapted to slide relative to the inner housing parallel to the mating axis of the connector assembly.

18. The connector assembly according to claim 17, wherein the inner housing comprises a teeth area and the outer housing comprises a corresponding teeth area and wherein the teeth area of the inner housing engages with the corresponding teeth area of the outer housing, when the slider is in the lock state.

19. The connector assembly according to claim 18, wherein the corresponding teeth area of the outer housing is arranged at a fastening arm, which fastening arm is fixed at one end to the outer housing and wherein the opposite end of the fastening arm is free to allow a bending movement of the arm towards the inner housing.

20. The connector assembly according to claim 19, wherein the fastening arm comprises an actuating ramp facing away from the inner housing (and when the slider is moved into the lock state the slider is adapted to engage the actuating ramp, thereby bending the fastening arm towards the inner housing, such that the teeth area of the outer housing engages with the teeth area of the inner housing.

21. The connector assembly according to claim 20, wherein the connector assembly further comprises a spring, arranged between the inner housing and the outer housing, wherein the spring is adapted such that it biases the inner housing into the mating direction of the connector assembly, when the outer housing is held fixed.

22. The connector assembly according to claim 21, wherein the inner housing comprises a first housing part and a second housing part, wherein an edge seal is provided between edges of the first housing part and of the second housing part.

23. The connector assembly according to claim 22, wherein the first housing part and the second housing part are assembled by a snap-in connection.

24. The connector assembly according to claim 23, wherein the inner housing further comprises a front seal and/or a back seal.

* * * * *